F. Skinner,
Slivering Wood.
Nº 26,791. Patented Jan. 10, 1860.

Witnesses: Albert C. Babcock, R. Fitzgerald

Inventor. F. Franklin Skinner

UNITED STATES PATENT OFFICE.

FRANKLIN SKINNER, OF NEW HAVEN, CONNECTICUT.

MACHINE FOR CUTTING SHAVINGS FOR MATTRESSES.

Specification of Letters Patent No. 26,791, dated January 10, 1860.

*To all whom it may concern:*

Be it known that I, FRANKLIN SKINNER, of the city and county of New Haven, in the State of Connecticut, have invented a new and useful Improvement in Machinery for Preparing Wood-Shavings for Mattresses, &c.; and I do hereby declare that the following is a full, clear, and exact description of the construction, character, and operation of the same, reference being had to the accompanying drawings, which make part of this specification, in which—

Figure 1:
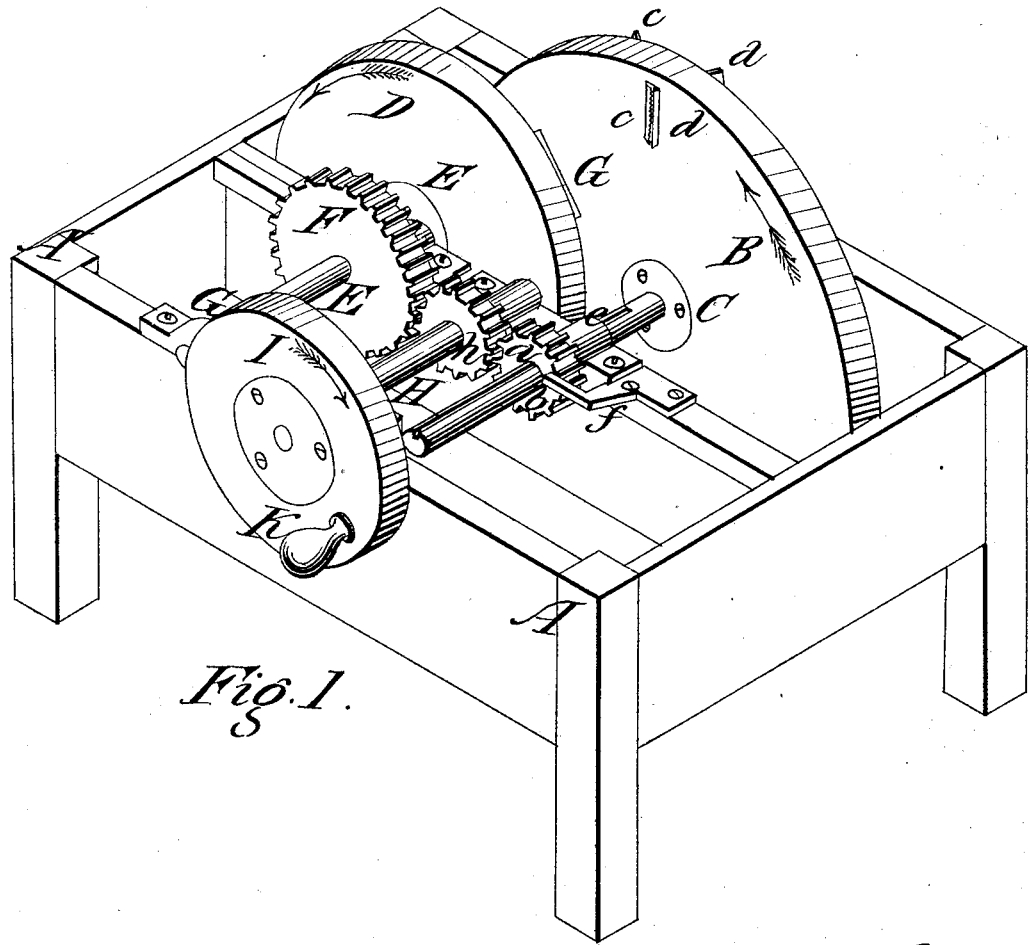
Figure 2:

Figure 1 is a perspective view of the whole apparatus, showing the position of the block, and the cutters, and the gear wheels which revolve them. Fig. 2 is a perspective view of a section of the cutter wheel, showing how the cutters are attached.

My improvement consists in the use of two face wheels, one to carry the block to be cut into shavings, and the other to carry the cutters;—and, in setting the faces of these in such relation to each other that the outer edge of the cutters, when the wheels are revolving will pass across the disk of the other wheel, (which carries the block,) in the direction of its diameters, or through the longitudinal center of the block, so as to cut a shaving from one half the width of the block at each revolution of the cutter wheel, (the cutter wheel revolving twice while the other revolves once,) thus causing the cutters to trace an epicycloidal line across the wheel which carries the block.

I make the frame, A, A, of cast iron, or any other suitable material, substantially, in the form shown in Fig. 1. I make the cutter wheel, B, of cast iron, or any other suitable material, somewhat larger in diameter than the other wheel, and secure it firmly on an arbor, or shaft, as shown at $c$, Fig. 1. On this shaft, C, I place a pinion, as at $a$, through which the shaft slides freely, but is prevented from turning by a spline, or projection, working in a longitudinal slot, or groove, as shown at $b$, Fig. 1, so as to allow of feed motion, to bring the cutters up to the block as it varies in thickness while being worked up, (and this pinion $a$, is retained in its position by the piece, $f$). In the face of this wheel, B, I fit two cutters, as shown at $c$, and $d$, Figs. 1, and 2. I make the cutter $c$, with its edge serrated, so that it acts as spurs, or a toothed plane, to scratch, or mark, the block for the width of the shaving;—and the cutter, $d$, in the ordinary form of a plane iron, to take off a shaving from the face of the block after it has been properly marked out by the cutter, $c$. I make the other wheel, D, of cast iron, or any other suitable material, of sufficient diameter to receive, and sustain, a block of the desired size, and fit it firmly on an arbor, or shaft, as shown at E, E, on which shaft, C, I firmly secure a gear wheel, F, with just twice the number of teeth that are on the pinion $a$. To the face of this wheel, D, I attach the block from which the shavings are to be cut, (as indicated at G,) by any convenient clamps, screws, or other well known devices. I place the arbors, C, and E, in suitable bearings in the frame, as at $e$, $g$, &c. and between these arbors I place another arbor, as H, on which I secure a pinion, or wheel, as $h$, which works into, and revolves, the pinion, $a$, and the wheel, F. And on the other end of this arbor, H, I use a pulley, as I, with a band, or a crank pin, as K, to which I apply the power.

Having constructed the several parts, and arranged them as before described, I adjust the cutters, $c$, and $d$, to cut the desired depth, and apply the power by a band on the pulley, I, or the crank, K, (or by any other means,) and attach the block, as at G, when by the revolution of the wheels B and D, (the wheel B, making two revolutions while the wheel D, makes one,) the cutter $c$, will divide, and the cutter $d$, will shave off, the wood in the desired shape for use.

As the cutters pass over the block in the epicycloidal line, which coincides with the diameter of the wheel, D, they must, of course, give a shaving, or "broad axe, cut," so that the shaving removed from the block, will assume a spiral, or helical curve, and therefore be well fitted for use. Instead of one block, if it be desired to make the shaving shorter, two blocks may be put on, connecting in the center, or, two sets of cutters may be used and four blocks meeting at the center; but I recommend the method first, and particularly, described; and, the wheels B, and D, or either of them, may be made with spokes, or arms, and with, or without a rim; and, the wheel B, (or the arms as equivalent,) may be so extended that the center of the cutters may trace the epicycloidal line, and the cutters take shavings from the whole face of the block at each cut, but neither of these methods is recommended.

I am aware that cutters have been used to determine both the width, and thickness of the shaving, and, that revolving cutters have been used for ages, and that tracing an epicycloidal line as a diameter of a circle is not new, I, therefore, do not claim either of these, as my invention, but—

What I claim as my invention, and desire to secure by Letters Patent, is—

The combination of the two wheels, B, and D, (or their equivalents,) with their appendages, when the whole is constructed, and made to produce the result, substantially, as herein described.

FRANKLIN SKINNER.

Witnesses:
ALBERT C. BABCOCK,
R. FITZGERALD.